J. AND G. MARTIN.
GAS TAP LOCKING DEVICE.
APPLICATION FILED MAR. 22, 1920.
1,344,704.
Patented June 29, 1920.
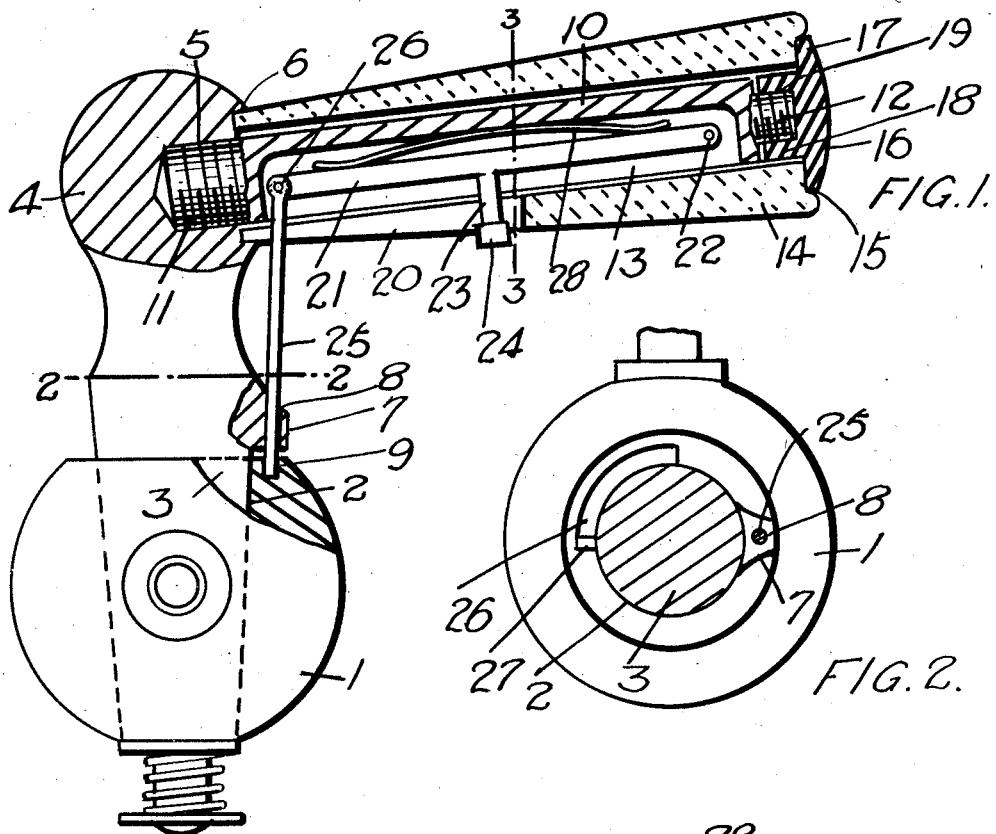
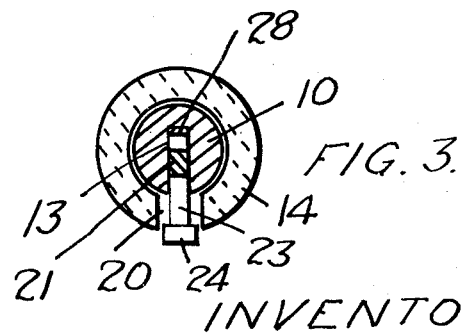
INVENTORS.
JOSEPH MARTIN.
GEOFFREY MARTIN.
BY

UNITED STATES PATENT OFFICE.

JOSEPH MARTIN AND GEOFFREY MARTIN, OF TORONTO, ONTARIO, CANADA.

GAS-TAP-LOCKING DEVICE.

1,344,704.  Specification of Letters Patent.  Patented June 29, 1920.

Application filed March 22, 1920. Serial No. 367,718.

*To all whom it may concern:*

Be it known that we, JOSEPH MARTIN, inspector, and GEOFFREY MARTIN, mechanic, both subjects of the King of Great Britain, residing at Toronto, in the county of York, Province of Ontario, Canada, have invented certain new and useful Improvements in Gas-Tap-Locking Devices, of which the following is the specification.

Our invention relates to improvements in gas tap locking devices and the object of the invention is to devise simple means for preventing a child from readily turning on a gas tap of a gas range and it consists essentially of the arrangement and construction of parts as hereinafter more particularly explained.

Figure 1 is an elevation partially in section, of a gas tap and showing our locking device.

Fig. 2 is a sectional view on line 2—2, Fig. 1.

Fig. 3 is a sectional view on line 3—3, Fig. 1.

In the drawings like characters of reference indicate corresponding parts in each figure.

1 indicates the body of our gas tap provided with a tapered bore 2 in which fits the usual tapered plug 3. The plug 3 is provided with a ball upper end 4 provided with an internally threaded recess 5, the outer end of the recess 5 being provided with an annular enlargement 6. 7 is a lug which extends outwardly from the body of the valve plug 3, such lug having an orifice 8 which is normally in alinement with a recess 9 formed in the body 1 of the valve. 10 is the metal core of the handle of our gas tap, the inner end of the core 10 is threaded at 11, such threaded portion being screwed into the internally threaded recess 5. The outer end of the core 10 is provided with a reduced externally threaded portion 12 for a purpose which will hereinafter be explained. 13 is a recess formed in the core 10 and extending longitudinally thereof. 14 is a covering sleeve which is preferably tapered and fits at its inner or small end into the annular recess 6, the opposite or large end of the covering sleeve is provided with a recess 15. 16 is a nut having a head 17 fitting the recess 15 and a stem 18 having an internally threaded orifice 19 into which the reduced portion 12 of the core 10 is screwed. By this means the cover member 14 is clamped in position between the head of the screw 16 and the recessed portion 6 of the ball end 4 of the valve plug. 20 is a slot which is cut longitudinally in the covered member 14 extending from its inner end. 21 is a lever pivoted at 22 within the recess 13 of the core 10. The lever 21 is spring pressed by a bow spring 28 extending between the upper edge of the lever 21 and the base of the recess 13. 23 is a stem which extends downwardly from the lever 21 intermediately of its length through the slot 20. 24 is a knob or other suitably formed enlargement located at the lower end of the stem 23. 25 is a plunger pin pivotally mounted at 26 to the inner end of the lever 21. The lower end of the plunger pin extends through the orifice 8 of the lug 7 and normally into the recess 9 of the valve body 1. The valve body 1 is also provided with a concentric recess 26 and the valve plug with the limiting pin 27.

Having described the principal parts involved in our invention, we will briefly describe the operation of the same.

When it is desired to turn on the tap, the operator grips the handle of the tap and presses his thumb or finger against the knob 24, thereby lifting the lever 21 against the pressure of the spring 22 raising the plunger pin 25 out of the recess 9. The valve plug is then free to be turned to the open position, the movement being limited by the pin 27 coming in contact with the end of the recess 26. When closing the valve, all that it is necessary to do is to swing the handle to the closed position. As it reaches this position, the pin 27 contacts with the end of the recess 26 definitely alining the plunger pin 25 with the recess 9, the plunger pin then being forced into such recess by the spring 28.

It will thus be seen that we have provided a very simple device which is practically hidden from view and which a child is not likely to see or be able to operate and which not only prevents a child operating the tap but prevents the tap being inadvertently opened at any time.

What we claim as our invention is:

1. In a gas tap for gas stoves, the combination with a valve body and valve plug, of a handle comprising a core screwed at one end into the upper end of the valve plug and having a longitudinal recess formed therein, a cover surrounding the core and having a longitudinal slot, and means bearing against the outer end of the cover and engaging the core for holding the cover between such means and the valve plug, a lever pivotally mounted at one end within the recess of the core, a bow spring inserted between the lever and the base of the recess, a depending stem extending from the lever through the slot of the cover, a plunger pin pivotally carried by the opposite end of the lever adapted to engage the valve body and guiding means carried by the valve plug through which the plunger extends.

2. The combination with a valve body and valve plug, of a hollow handle member for the plug having a slot in the lower horizontal wall portion thereof, a bar within said handle pivotally mounted at one end and provided intermediate its ends with an integral depending stem arranged to project downwardly through the slot in the handle member, a locking pin pivotally secured at its upper end to the free end of said bar and having its lower end disposed for locking engagement with the valve body to prevent rotation of the valve plug, and spring means disposed between the bar and the upper portion of the handle member normally tending to swing said bar downwardly to engage the locking pin with the valve body.

JOSEPH MARTIN.
GEOFFREY MARTIN.